(12) United States Patent
Capek et al.

(10) Patent No.: US 10,507,691 B2
(45) Date of Patent: Dec. 17, 2019

(54) MULTI-PIECE SPOOL FOR AN AUTOMOBILE AXLE ASSEMBLY

(71) Applicant: Strange Oval, Morton Grove, IL (US)

(72) Inventors: Jeffrey S. Capek, Streamwood, IL (US); Dmitry Zhukovsky, Glenview, IL (US)

(73) Assignee: Strange Oval, Morton Grove, IL (US)

(*) Notice: Subject to any disclaimer, the term of this patent is extended or adjusted under 35 U.S.C. 154(b) by 182 days.

(21) Appl. No.: 15/795,128

(22) Filed: Oct. 26, 2017

(65) Prior Publication Data

US 2019/0126681 A1    May 2, 2019

(51) Int. Cl.
B60B 35/14    (2006.01)
B60B 35/16    (2006.01)
B60B 35/12    (2006.01)

(52) U.S. Cl.
CPC ............ *B60B 35/14* (2013.01); *B60B 35/122* (2013.01); *B60B 35/16* (2013.01)

(58) Field of Classification Search
CPC ................................ B60B 35/14; B60B 35/16
USPC ......................................................... 301/137
See application file for complete search history.

(56) References Cited

U.S. PATENT DOCUMENTS

| | | | |
|---|---|---|---|
| 4,337,953 A * | 7/1982 | Ikeda | F16J 15/3232 180/254 |
| 5,078,661 A | 1/1992 | Esaki | |
| 5,232,416 A | 8/1993 | Amborn et al. | |
| 5,556,344 A * | 9/1996 | Fox | F16H 48/08 475/234 |
| 5,704,867 A | 1/1998 | Bowen | |
| 6,491,126 B1 * | 12/2002 | Robison | B60K 17/3462 180/233 |
| 6,634,979 B1 | 10/2003 | Quaife | |
| 7,353,927 B2 | 4/2008 | Park | |
| 8,070,641 B2 * | 12/2011 | McVea | F16H 48/10 475/249 |
| 8,287,418 B2 | 10/2012 | McVea et al. | |
| 8,961,349 B2 * | 2/2015 | Kellogg | F16H 48/22 475/184 |
| 2012/0083380 A1 | 4/2012 | Reed et al. | |
| 2015/0167750 A1 | 6/2015 | Grogg et al. | |
| 2015/0202959 A1 | 7/2015 | Richard, Jr. et al. | |
| 2016/0025201 A1 | 1/2016 | Wrona et al. | |
| 2018/0283472 A1 * | 10/2018 | Fukuda | F16D 41/088 |

* cited by examiner

*Primary Examiner* — S. Joseph Morano
*Assistant Examiner* — Jean W Charleston
(74) *Attorney, Agent, or Firm* — Jeffrey Watson; Mathew Grell; Grell & Watson Patent Attorneys LLC (57) ABSTRACT

A multi-piece spool includes a first spool piece and a second spool piece. The first spool piece is configured to receive a first axle. The second spool piece is configured to receive a second axle. The first spool piece is configured to attach to the second spool piece where the first spool piece and the second spool piece are rotationally affixed about a longitudinal axis created through the first axle and the second axle. Wherein, the multi-piece spool is configured for locking the first axle with the second axle for rotating the first axle and the second axle together when the first spool piece is attached to the second spool piece.

21 Claims, 4 Drawing Sheets

MULTI-PIECE SPOOL FOR AN AUTOMOBILE AXLE ASSEMBLY

FIELD OF THE DISCLOSURE

The present disclosure generally relates to an automotive axle assembly. More specifically, the present disclosure relates to a multiple piece spool for an automotive race car axle assembly wherein a component of that assembly called a spool is redesigned for improved performance.

BACKGROUND

Generally speaking, a typical automotive axle assembly consists of a housing, gear set, differential, a pair of axle shafts, and supporting ancillary components. In simple terms, rotational effort is input through a pinion gear which turns a ring gear. The ring gear is fastened to a differential which then directs torque to the two axles. The job of the differential is to allow a variation in axle speed as the vehicle travels around corners.

In many racing environments, there are several drawbacks to using a differential including undesirable weight, insufficient strength, and less than optimal ability to deliver torque to the axles through varying traction conditions. For these reasons, a device called a spool may be employed. A typical spool is a one-piece component (see FIGS. 1 and 2) that engages both rear axles (driver and passenger side) effectively locking them together. This means both axles will rotate at the same rate regardless of vehicle dynamics and available traction. The end result is the ability to transfer more torque through the axles improving tractive effort. Also, the simple design of the current one-piece spool reduces weight over a standard differential. In addition, the improved material of the current one-piece spool yields enhanced strength.

However, the desire and benefits to reducing weight in automobile components, especially racing automobile components is always present. In addition, the desire and benefits to providing stronger and more reliable automobile components, especially racing automobile components is also always present. As such, there is clearly an unmet need to provide a spool for the axle assembly of an automobile that is lighter in weight, stronger, and/or more reliable or lasts longer than the conventional one-piece component.

The instant disclosure of a multiple-piece spool may be designed to address at least some aspects of the problems disclosed above.

SUMMARY

Briefly described, in a possibly preferred embodiment, the present disclosure overcomes the above-mentioned disadvantages and meets the recognized need for such a device by providing a multiple-piece spool for an automobile axle assembly. The multiple-piece spool may generally include a first spool piece and a second spool piece. The first spool piece may be configured to receive a first axle. The second spool piece may be configured to receive a second axle. The first spool piece may be configured to attach to the second spool piece where the first spool piece and the second spool piece are rotationally affixed about a longitudinal axis created through the first axle and the second axle. Wherein, the multi-piece spool is configured for locking the first axle with the second axle for rotating the first axle and the second axle together when the first spool piece is attached to the second spool piece.

One feature of the instant disclosure may be that the first and second spool pieces may be made from aluminum.

In select embodiments, the first spool piece may include a first cylindrical journal configured to receive the first axle. The first cylindrical journal of the first spool piece may include a first spline insert configured to mate to first external splines of the first axle. In select embodiments, the first spline insert may be made of steel. The first spline insert may include a set of first insert external splines configured to mate to first internal splines of the first cylindrical journal, and a set of first insert internal splines configured to mate to the first external splines of the first axle. Whereby, the first spline insert may rotationally affix the first spool piece to the first axle via the first spline insert in the first cylindrical journal. In select embodiments, the first spline insert may be press fit inside the first cylindrical journal. In select embodiments, the first spline insert may be retained in the first cylindrical journal of the first spool piece via a first retaining ring.

In select embodiments, the second spool piece may include a second cylindrical journal configured to receive the second axle. The second cylindrical journal of the second spool piece may include a second spline insert configured to mate to second external splines of the second axle. In select embodiments, the second spline insert may be made of steel. The second spline insert may include a set of second insert external splines configured to mate to the second internal splines of the second cylindrical journal, and a set of second insert internal splines configured to mate to the second external splines of the second axle. Whereby, the second spline insert may rotationally affix the second spool piece to the second axle via the second spline insert in the second cylindrical journal. In select embodiments, the second spline insert may be press fit inside the second cylindrical journal. In select embodiments, the second spline insert may be retained in the second cylindrical journal of the second spool piece via a second retaining ring.

Another feature of the instant disclosure may be that the first spool piece can include a first longitudinal mating surface, and the second spool piece may include a second longitudinal mating surface. Wherein, the first longitudinal mating surface may mate to the second longitudinal mating surface when the first spool piece is attached to said second spool piece. In select embodiments, a seal may be included between the first longitudinal mating surface and the second longitudinal mating surface configured for sealing the inside of the multi-piece spool when the first spool piece is attached to said second spool piece. As an example, and clearly not limited thereto, the seal may be a rubber o-ring positioned between the first longitudinal mating surface and the second longitudinal mating surface for sealing out oil from entering the multi-piece spool.

Another feature of the instant multi-piece spool may be the inclusion of an attachment means for attaching the first spool piece and the second spool piece where the first spool piece and the second spool piece may be rotationally affixed about the longitudinal axis created through the first axle and the second axle. In select embodiments, the attachment means may include screws inserted through a radial protrusion created by a first radial tab of the first spool piece and a second radial tab of the second spool piece. As an example, and clearly not limited thereto, the attachment means may include three flat head screws unequally spaced around a periphery of the radial protrusion, wherein the radial protrusion is outside of an o-ring between a first longitudinal mating surface of the first spool piece and a second longitudinal mating surface of the second spool piece.

Another feature of the instant multi-piece spool may be the inclusion of at least one lightening hole. The at least one lightening hole may be configured for reducing the weight of the multi-piece spool. In select embodiments, the at least one lightening hole may include a plurality of lightening holes positioned around the periphery of the radial protrusion.

Another feature of the instant multi-piece spool may be the inclusion of at least one axial hole. The at least one axial hole may be configured for affixing a ring gear to the multi-piece spool for turning the first axle and the second axle together via the multi-piece spool. In select embodiments, the at least one axial hole may include a plurality of threaded axial holes positioned around the periphery of the radial protrusion.

Another feature of the instant multi-piece spool may be that the first spool piece can include a hollow interior. The hollow interior of the first spool piece may be configured for adding to the strength of the multi-piece spool while reducing the weight. The hollow interior of the first spool piece may create a bell-shaped spool piece.

Another feature of the instant multi-piece spool may be that the second spool piece can include a flange. The flange may be configured for creating the first mating surface configured to seal to the second mating surface of the second spool piece. The flange of the second spool piece may create a flange-shaped spool piece.

Another feature of the instant multi-piece spool may be that it can be configured for use in a rear axle assembly of a race car.

As such, in another aspect, the instant disclosure provides for an axle assembly. The axle assembly generally includes a first axle, a second axle, and a ring gear attached to the multi-piece spool. Wherein, the multi-piece spool may be configured for rotating the first axle and the second axle together via rotation from the ring gear. The multi-piece spool used in the axle assembly may be any of the embodiments of the multiple-piece spool, as shown and/or described herein.

In select embodiments, the axle assembly may be configured for use in a rear axle of a race car.

The foregoing illustrative summary, as well as other exemplary objectives and/or advantages of the disclosure, and the manner in which the same are accomplished, may become more apparent to one skilled in the art from the prior Summary, and the following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
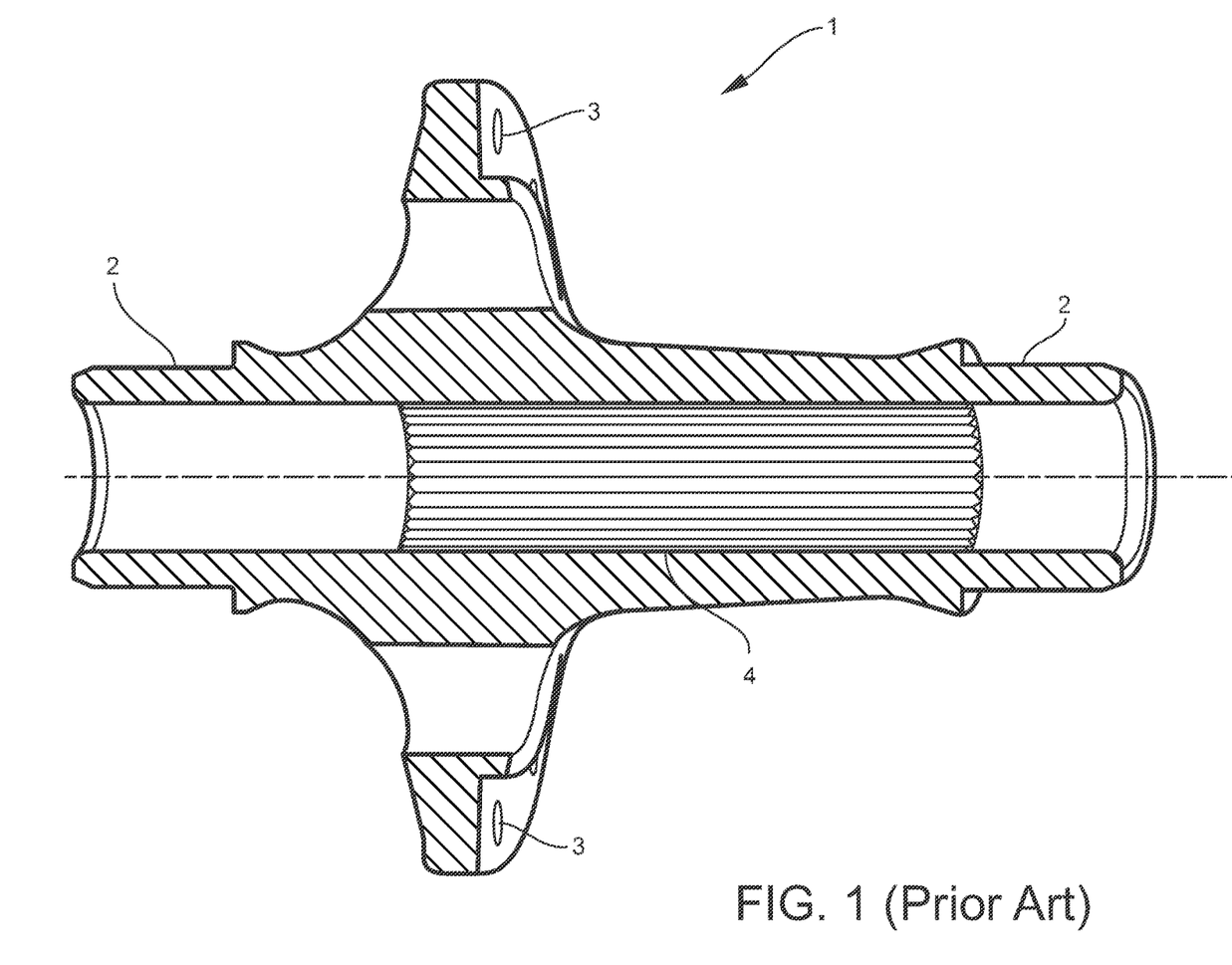
FIG. 1 is a cross-sectional perspective view of a one-piece spool according to the prior art.
Figure 2:
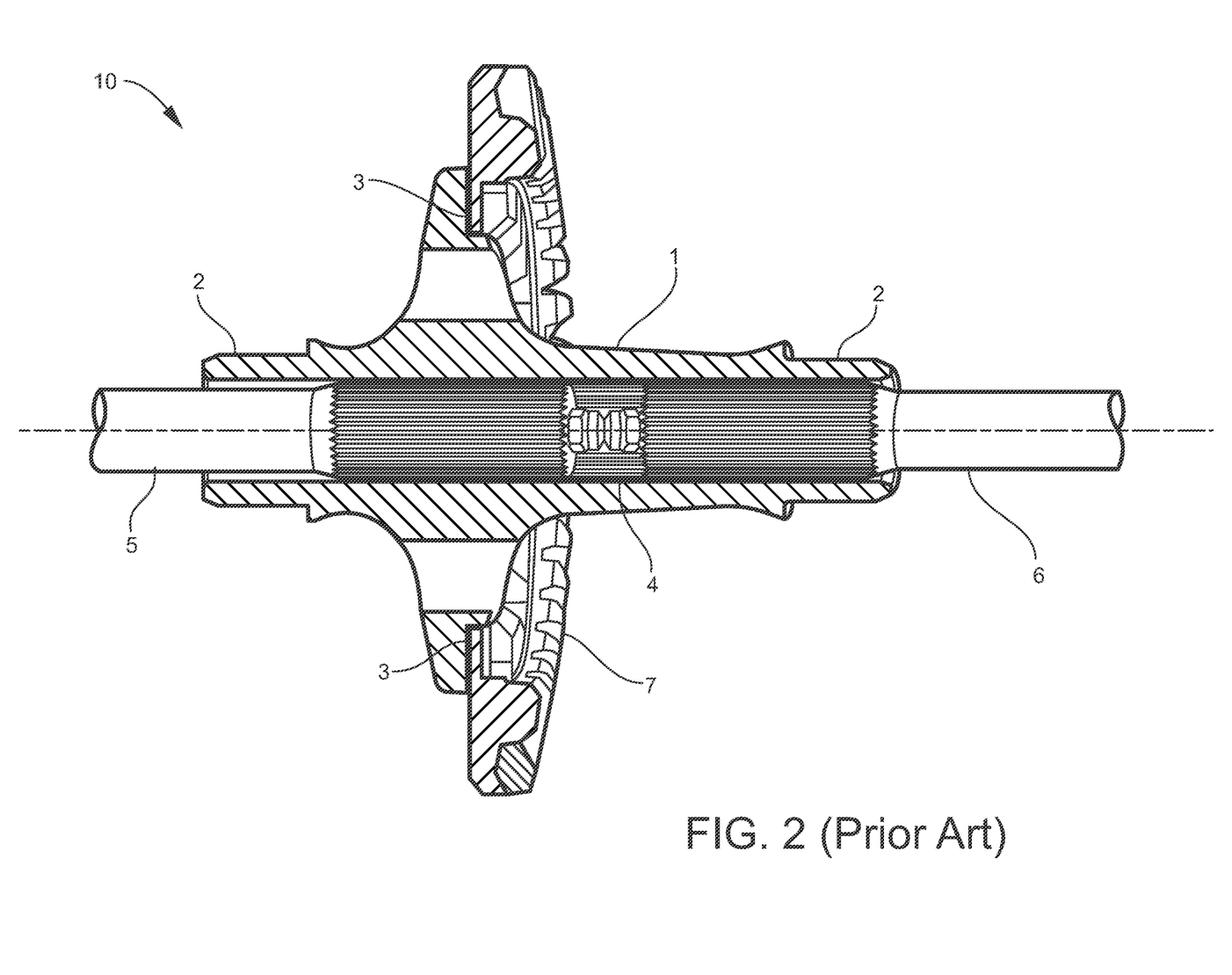
FIG. 2 is a cross-sectional perspective view of an axle assembly according to the prior art with the one-piece spool from FIG. 1 with the ring gear, driver's side axle, and passenger side axle included.

Referring first to FIG. 1-2, a conventional one-piece spool 1 is shown according to the prior art. Conventional one-piece spool, although not limited thereto, may typically be constructed from aluminum parts. Cylindrical journals 2 on both ends of one-piece spool 1 may be configured for accepting bearings to support and locate one-piece spool 1 in a housing. A series of axial holes 3 through a flange may be utilized for bolting the one-piece spool 1 to a ring gear 7, as shown in FIG. 2. Internal splines 4 are provided inside one-piece spool for mating with the driver's side axle 5 and the passenger's side axle 6 (or vice versa). As shown in FIG. 2, conventional axle assembly 10 is shown with one-piece spool 1 assembled with ring gear 7, driver's side axle 5, and passenger's side axle 6.

The instant disclosure provides a multiple piece spool designed for performance enhancement on the current one-piece spool 1 architecture. Having a separate piece construction may greatly improve the design geometry freedom of the spool device while being straightforward to manufacture. This geometry freedom is where the performance gains may be derived.

Figure 3:
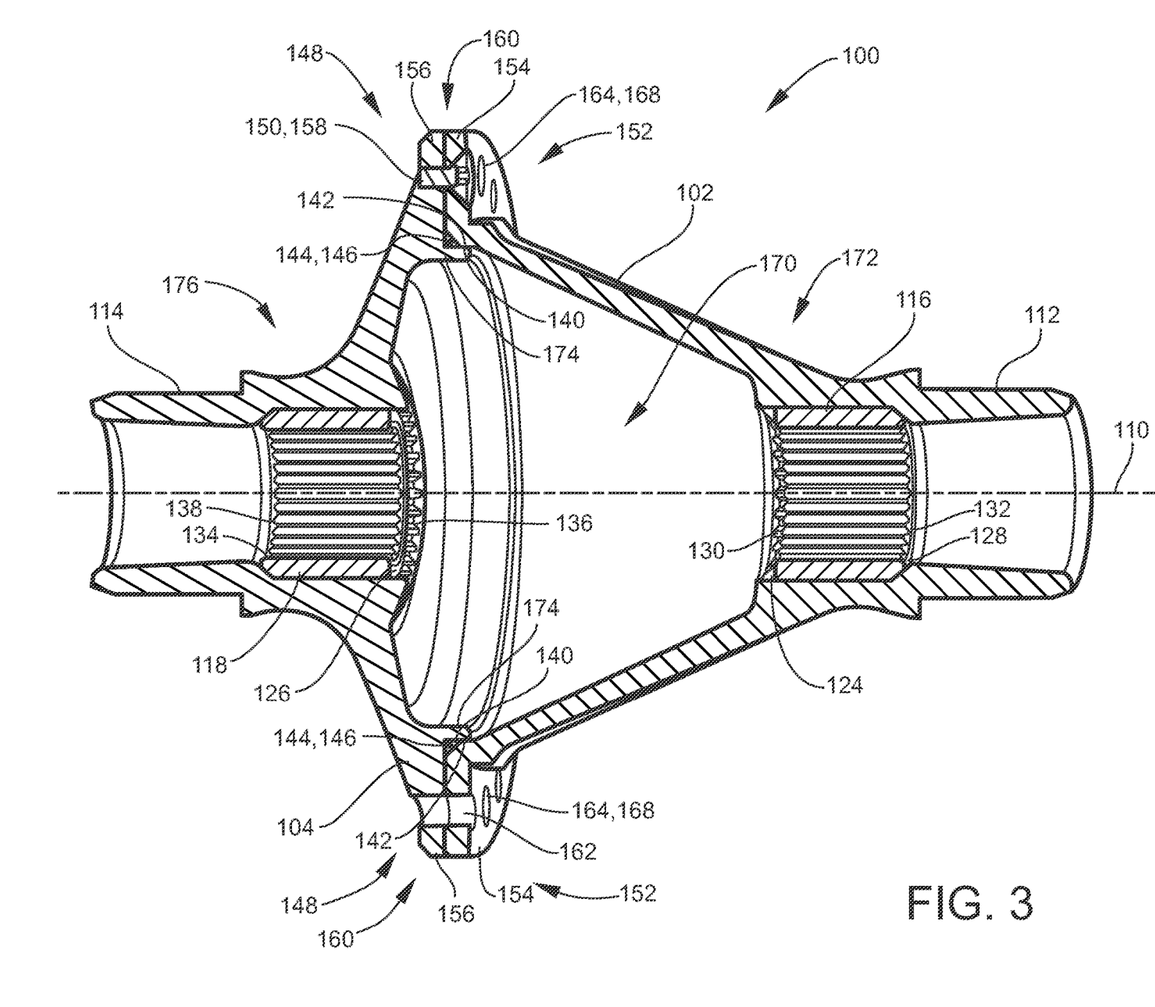
FIG. 3 is a cross-sectional perspective view of select embodiments of the multiple-piece spool according to the instant disclosure.
Figure 4:
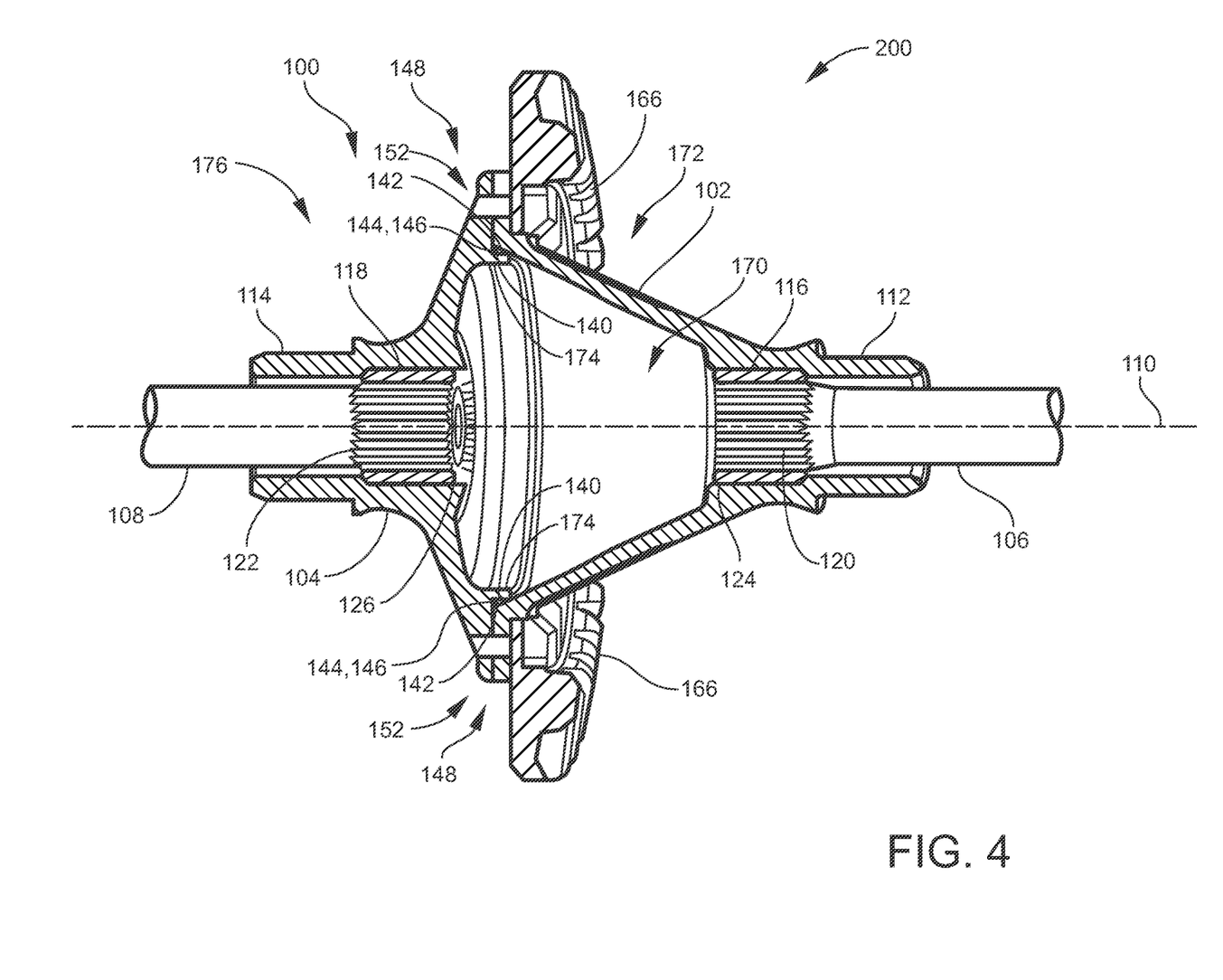
FIG. 4 is a cross-sectional perspective view of an axle assembly according to select embodiments of the instant disclosure with the multiple piece spool from FIG. 3 with the ring gear, driver's side axle (i.e. first axle), and passenger side axle (i.e. second axle) included.

Referring now to FIGS. 3-4, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

With reference to FIGS. 3-4, the present invention embraces multiple-piece spool 100. Briefly described, in a possibly preferred embodiment, the present disclosure overcomes the above-mentioned disadvantages and meets the recognized need for such a device by providing multiple-piece spool 100 for an automobile axle assembly 200 (see FIG. 4). The multiple-piece spool 100 may generally include first spool piece 102 and second spool piece 104. Although referred to herein as pieces, first spool piece 102 and second spool piece 104 are clearly not intended to be equal pieces and may just be considered as one side or piece of the multiple-piece spool 100. The first spool piece 102 may be configured to receive first axle 106 (like the driver's side axle or the passenger's side axle). The second spool piece 104 may be configured to receive second axle 108 (like the other of the driver's side axle or the passenger's side axle). The first spool piece 102 may be configured to attach to the second spool piece 104 where the first spool piece 102 and the second spool piece 104 are rotationally affixed about longitudinal axis 110 created through the first axle 106 and the second axle 108. Wherein, the multi-piece spool 100 may be configured for locking the first axle 106 with the second axle 108 for rotating the first axle 106 and the second axle 108 together when the first spool piece 102 may be attached to the second spool piece 104.

One feature of the instant disclosure may be that the first and second spool pieces (102 and 104) may be made from aluminum. This may provide for a light weight yet sturdy construction of multiple-piece spool 100.

In select embodiments, the first spool piece 102 may include first cylindrical journal 112 configured to receive the first axle 106. The first cylindrical journal 112 of the first spool piece 102 may include first spline insert 116 configured to mate to first external splines 120 of the first axle 106. In select embodiments, the first spline insert 116 may be made of steel. This feature of first spline insert 116 being made of steel may give several benefits, including, but not limited to: the first spline insert 116 may have a large diameter coarse first external insert spline 128 that is press fit into the female spline, or first internal splines 130 of the first cylindrical journal 112 of the first piece 102. This may provide a stronger connection than the current spline in one-piece spools, like prior art spool 1 shown in FIGS. 1-2. Because the first splined insert 116 may be made of a steel stronger than the aluminum currently used, the overall length of the spline can be reduced producing an additional weight reduction. As such, in select embodiments, the first spline insert 116 may include set of first insert external splines 128 configured to mate to first internal splines 130 of the first cylindrical journal 112, and set of first insert internal splines 132 may be configured to mate to the first external splines 120 of the first axle 106. Whereby, the first spline insert 116 may rotationally affix the first spool piece 102 to the first axle 106 via the first spline insert 116 in the first cylindrical journal 112. In select embodiments, the first spline insert 116 may be press fit inside the first cylindrical journal 112. In select embodiments, the first spline insert 116 may be retained in the first cylindrical journal 112 of the first spool piece 102 via a first retaining ring 124. However, the disclosure is not so limited, and the first spline insert 116 may be secured in first cylindrical journal 112 by any means or device.

In select embodiments, the second spool piece 104 may include second cylindrical journal 114 configured to receive the second axle 108. The second cylindrical journal 114 of the second spool piece 104 may include second spline insert 118 configured to mate to second external splines 122 of the second axle 108. In select embodiments, the second spline insert 118 may be made of steel. This feature of second spline insert 118 being made of steel may give several benefits, including, but not limited to: the second spline insert 118 may have a large diameter coarse second external insert spline 134 that is press fit into the female spline, or second internal splines 136 of the second cylindrical journal 114 of the second piece 104. This may provide a stronger connection than the current spline in one-piece spools, like prior art spool 1 shown in FIGS. 1-2. Because the second splined insert 118 may be made of a steel stronger than the aluminum currently used, the overall length of the spline can be reduced producing an additional weight reduction. As such, the second spline insert 118 may include a set of second insert external splines 134 configured to mate to the second internal splines 136 of the second cylindrical journal 114, and a set of second insert internal splines 138 configured to mate to the second external splines 122 of the second axle 108. Whereby, the second spline insert 118 may rotationally affix the second spool piece 104 to the second axle 108 via the second spline insert 118 in the second cylindrical journal 114. In select embodiments, the second spline insert 118 may be press fit inside the second cylindrical journal 114. In select embodiments, the second spline insert 118 may be retained in the second cylindrical journal 114 of the second spool piece 104 via a second retaining ring 126. However, the disclosure is not so limited, and the second spline insert 118 may be secured in first cylindrical journal 112 by any means or device.

Another feature of the instant disclosure may be that the first spool piece 102 can include first longitudinal mating surface 140, and the second spool piece 104 may include second longitudinal mating surface 142. Wherein, the first longitudinal mating surface 140 may mate to the second longitudinal mating surface 142 when the first spool piece 102 is attached to said second spool piece 104. In select embodiments, seal 144 may be included between the first longitudinal mating surface 140 and the second longitudinal mating surface 142 configured for sealing the inside of the multi-piece spool when the first spool piece 102 is attached to said second spool piece 104. As an example, and clearly not limited thereto, the seal 144 may be rubber o-ring 146 positioned between the first longitudinal mating surface 140 and the second longitudinal mating surface 142 for sealing out oil from entering the multi-piece spool.

Another feature of the instant multi-piece spool may be the inclusion of attachment means 148 for attaching the first spool piece 102 and the second spool piece 104 where the first spool piece 102 and the second spool piece 104 may be rotationally affixed about the longitudinal axis 110 created through the first axle 106 and the second axle 108. Attachment means 148 may be any means, device, or combination thereof, for attaching the first spool piece 102 and the second spool piece 104 where the first spool piece 102 and the second spool piece 104 may be rotationally affixed about the longitudinal axis 110 created through the first axle 106 and the second axle 108. In select embodiments, the attachment means 148 may include screws 150 inserted through radial protrusion 152 created by first radial tab 154 of the first spool piece 102 and second radial tab 156 of the second spool piece 104. As an example, and clearly not limited thereto, the attachment means 148 may include three flat head screws 158 unequally spaced around periphery 160 of the radial protrusion 152. Wherein the radial protrusion 152 may be outside of o-ring 146 between the first longitudinal mating surface 140 of the first spool piece 102 and the second longitudinal mating surface 142 of the second spool piece 104.

Another feature of the instant multi-piece spool 100 may be the inclusion of at least one lightening hole 162. The at least one lightening hole 162 may be configured for reducing the weight of the multi-piece spool 100. In select embodiments, the at least one lightening hole 162 may include a plurality of lightening holes 162 positioned around the periphery 160 of the radial protrusion 152.

Another feature of the instant multi-piece spool 100 may be the inclusion of at least one axial hole 164. See FIG. 3. The at least one axial hole 164 may be configured for affixing ring gear 166 (see FIG. 4) to the multi-piece spool 100 for turning the first axle 106 and the second axle 108 together via the multi-piece spool 100. In select embodiments, the at least one axial hole 164 may include a plurality of threaded axial holes 168 positioned around the periphery 160 of the radial protrusion 152.

Another feature of the instant multi-piece spool may be that the first spool piece 102 can include hollow interior 170. The hollow interior 170 of the first spool piece 102 may be configured for adding to the strength of the multi-piece spool 100 while reducing the weight. The hollow interior 170 of the first spool piece 102 may create bell-shaped spool piece 172, as shown in FIGS. 3-4.

Another feature of the instant multi-piece spool 100 may be that the second spool piece 104 can include flange 174. The flange 174 of second spool piece 104 may be configured for creating the first mating surface 140 of configured to seal to the second mating surface 142 of the second spool piece 104. The flange 174 of the second spool piece 104 may create flange-shaped spool piece 176, as shown in FIGS. 3-4.

Another feature of the instant multi-piece spool 100 may be that it can be configured for use in rear axle assembly 200, like of a race car, as shown in FIG. 4. Axle assembly 200 may generally include a first axle 106, second axle 108, and ring gear 166 attached to the multi-piece spool 100. Wherein, the multi-piece spool 100 may be configured for rotating the first axle 106 and the second axle 108 together via rotation from the ring gear 166. The multi-piece spool 100 used in the axle assembly 200 may be any of the embodiments of the multiple-piece spool 100, as shown and/or described herein.

Benefits of the multiple-piece spool 100 may include, but are not limited to, weight reduction, increased rigidity, and increased strength. Separate pieces, like first piece 102 and second piece 104, may allow easy access to removing material on the inside. These two pieces may be created with a hollow construction (as shown in FIGS. 3-4) thereby reducing weight. Rigidity may be improved by a larger outside profile without a weight penalty (again because of the hollow design). Separate pieces may also facilitate the addition of steel splined inserts (116 and 118) which may give several benefits. The inserts may have a large diameter coarse external spline that is press fit into the female spline in the spool pieces. This a stronger connection than the current spline in one piece spools, like the one-piece spool 1 shown in FIGS. 1-2. Because the splined insert is made of a steel stronger than the aluminum currently used, the overall length of the spline can be reduced producing an additional weight reduction.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A multi-piece spool comprising:
a first spool piece configured to receive a first axle, the first spool piece is made of an aluminum and includes a first cylindrical journal configured to receive the first axle, the first cylindrical journal of the first spool piece includes a first spline insert configured to mate to first external splines of the first axle, the first spline insert is made of a steel and includes a set of first insert external splines configured to mate to first internal splines of the first cylindrical journal, and a set of first insert internal splines configured to mate to the first external splines of the first axle, whereby, the first spline insert rotationally affixes the first spool piece to the first axle via the first spline insert in the first cylindrical journal, the first spline insert is press fit inside the first cylindrical journal, the first spline insert is retained in the first cylindrical journal of the first spool piece via a first retaining ring; and
a second spool piece configured to receive a second axle, the second spool piece is made of the aluminum and includes a second cylindrical journal configured to receive the second axle, the second cylindrical journal of the second spool piece includes a second spline insert configured to mate to second external splines of the second axle, the second spline insert is made of the steel and includes a set of second insert external splines configured to mate to the second internal splines of the second cylindrical journal, and a set of second insert internal splines configured to mate to the second external splines of the second axle, whereby, the second spline insert rotationally affixes the second spool piece to the second axle via the second spline insert in the second cylindrical journal, the second spline insert is press fit inside the second cylindrical journal, the second spline insert is retained in the second cylindrical journal of the second spool piece via a second retaining ring;
said first spool piece is configured to attach to said second spool piece where the first spool piece and the second spool piece are rotationally affixed about a longitudinal axis created through the first axle and the second axle;
wherein, the multi-piece spool is configured for locking the first axle with the second axle for rotating the first axle and the second axle together when the first spool piece is attached to the second spool piece.

2. The multi-piece spool according to claim 1, wherein:
the first spool piece includes a first longitudinal mating surface; and
the second spool piece includes a second longitudinal mating surface;
wherein, the first longitudinal mating surface mates to the second longitudinal mating surface when the first spool piece is attached to said second spool piece,
wherein, the multi-piece spool further comprising a seal between the first longitudinal mating surface and the second longitudinal mating surface configured for sealing the inside of the multi-piece spool when the first spool piece is attached to said second spool piece.

3. The multi-piece spool according to claim 2, wherein the seal is a rubber o-ring positioned between the first longitudinal mating surface and the second longitudinal mating surface for sealing out oil from entering the multi-piece spool.

4. The multi-piece spool according to claim 1, wherein the first spool piece and the second spool piece including an attachment means for attaching the first spool piece and the second spool piece, where the first spool piece and the second spool piece are rotationally affixed about the longitudinal axis created through the first axle and the second axle.

5. The multi-piece spool according to claim 4, wherein the attachment means including screws inserted through a radial protrusion created by a first radial tab of the first spool piece and a second radial tab of the second spool piece, wherein the attachment means including three flat head screws unequally spaced around a periphery of the radial protrusion, wherein the radial protrusion is outside of an o-ring between a first longitudinal mating surface of the first spool piece and a second longitudinal mating surface of the second spool piece.

6. The multi-piece spool according to claim 1 further including at least one lightening hole configured for reducing a weight of the multi-piece spool, wherein the at least one lightening hole including a plurality of lightening holes positioned around a periphery of a radial protrusion.

7. The multi-piece spool according to claim 1 further including at least one axial hole configured for affixing a ring gear to the multi-piece spool for turning the first axle and the second axle together via the multi-piece spool, wherein the at least one axial hole including a plurality of threaded axial holes positioned around a periphery of a radial protrusion.

8. The multi-piece spool according to claim 1, wherein:
the first spool piece including a hollow interior configured for adding to a strength of the multi-piece spool while reducing a weight, wherein the hollow interior of the first spool piece creating a bell-shaped spool piece; and
the second spool piece including a flange configured for creating a first mating surface configured to seal to a second mating surface of the second spool piece, wherein the flange of the second spool piece creating a flange-shaped spool piece.

9. The multi-piece spool of claim 1 being configured for use in a rear axle assembly of a race car.

10. A multi-piece spool comprising:
a first spool piece configured to receive a first axle, the first spool piece is made of an aluminum and includes a first cylindrical journal configured to receive the first axle, the first cylindrical journal of the first spool piece includes a first spline insert configured to mate to first external splines of the first axle, the first spline insert is made of a steel and includes a set of first insert external splines configured to mate to first internal splines of the first cylindrical journal, and a set of first insert internal splines configured to mate to the first external splines of the first axle, whereby, the first spline insert rotationally affixes the first spool piece to the first axle via the first spline insert in the first cylindrical journal, the first spline insert is press fit inside the first cylindrical journal, the first spline insert is retained in the first cylindrical journal of the first spool piece via a first retaining ring; and
a second spool piece configured to receive a second axle, the second spool piece is made of the aluminum and includes a second cylindrical journal configured to receive the second axle, the second cylindrical journal of the second spool piece includes a second spline insert configured to mate to second external splines of the second axle, the second spline insert is made of the steel and includes a set of second insert external splines configured to mate to the second internal splines of the second cylindrical journal, and a set of second insert internal splines configured to mate to the second external splines of the second axle, whereby, the second spline insert rotationally affixes the second spool piece to the second axle via the second spline insert in the second cylindrical journal, the second spline insert is press fit inside the second cylindrical journal, the second spline insert is retained in the second cylindrical journal of the second spool piece via a second retaining ring;
said first spool piece is configured to attach to said second spool piece where the first spool piece and the second spool piece are rotationally affixed about a longitudinal axis created through the first axle and the second axle, wherein:
the first spool piece includes a first longitudinal mating surface; and
the second spool piece includes a second longitudinal mating surface;
wherein, the first longitudinal mating surface mates to the second longitudinal mating surface when the first spool piece is attached to the second spool piece;
a seal between the first longitudinal mating surface and the second longitudinal mating surface configured for sealing the inside of the multi-piece spool when the first spool piece is attached to said second spool piece, wherein the seal is a rubber o-ring positioned between the first longitudinal mating surface and the second longitudinal mating surface for sealing out oil from entering the multi-piece spool;
wherein the first spool piece and the second spool piece including an attachment means for attaching the first spool piece and the second spool piece where the first spool piece and the second spool piece are rotationally affixed about the longitudinal axis created through the first axle and the second axle, wherein the attachment means including screws inserted through a radial protrusion created by a first radial tab of the first spool piece and a second radial tab of the second spool piece, wherein the attachment means including three flat head screws equally spaced around a periphery of the radial protrusion, wherein the radial protrusion is outside of the rubber o-ring between the first longitudinal mating surface of the first spool piece and the second longitudinal mating surface of the second spool piece;
at least one lightening hole configured for reducing a weight of the multi-piece spool, wherein the at least one lightening hole including a plurality of lightening holes positioned around the periphery of the radial protrusion;
at least one axial hole configured for affixing a ring gear to the multi-piece spool for turning the first axle and the second axle together via the multi-piece spool, wherein the at least one axial hole including a plurality of threaded axial holes positioned around the periphery of the radial protrusion;
wherein the first spool piece including a hollow interior configured for adding to a strength of the multi-piece spool while reducing the weight, wherein the hollow interior of the first spool piece creating a bell-shaped spool piece;
wherein the second spool piece including a flange configured for creating a first mating surface configured to seal to a second mating surface of the second spool piece, wherein the flange of the second spool piece creating a flange-shaped spool piece;
wherein, the multi-piece spool is configured for locking the first axle with the second axle for rotating the first axle and the second axle together when the first spool piece is attached to the second spool piece; and wherein the multi-piece spool being configured for use in a rear axle assembly of a race car.

11. An axle assembly comprising:
a first axle;
a second axle;
a ring gear attached to a multi-piece spool;
the multi-piece spool comprising:
   a first spool piece configured to receive the first axle, the first spool piece includes a first cylindrical journal configured to receive the first axle; and
   a second spool piece configured to receive the second axle, the second spool piece includes a second cylindrical journal configured to receive the second axle;
   said first spool piece is configured to attach to said second spool piece where the first spool piece and the second spool piece are rotationally affixed about a longitudinal axis created through the first axle and the second axle;
   wherein, the multi-piece spool is configured for rotating the first axle and the second axle together when the first spool piece is attached to the second spool piece;
said multi-piece spool is configured for locking the first axle with the second axle for rotating the first axle and the second axle together via rotation from the ring gear.

12. The axle assembly according to claim 11, wherein:
the first cylindrical journal of the first spool piece includes a first spline insert configured to mate to first external splines of the first axle, the first spline insert is made of a steel and includes a set of first insert external splines configured to mate to first internal splines of the first cylindrical journal, and a set of first insert internal splines configured to mate to the first external splines of the first axle, whereby, the first spline insert rotationally affixes the first spool piece to the first axle via the first spline insert in the first cylindrical journal, the first spline insert is press fit inside the first cylindrical journal, the first spline insert is retained in the first cylindrical journal of the first spool piece via a first retaining ring; and
the second cylindrical journal of the second spool piece includes a second spline insert configured to mate to second external splines of the second axle, the second spline insert is made of the steel and includes a set of second insert external splines configured to mate to the second internal splines of the second cylindrical journal, and a set of second insert internal splines configured to mate to the second external splines of the second axle, whereby, the second spline insert rotationally affixes the second spool piece to the second axle via the second spline insert in the second cylindrical journal, the second spline insert is press fit inside the second cylindrical journal, the second spline insert is retained in the second cylindrical journal of the second spool piece via a second retaining ring.

13. The axle assembly according to claim 11, wherein:
the first spool piece includes a first longitudinal mating surface; and
the second spool piece includes a second longitudinal mating surface;
wherein, the first longitudinal mating surface mates to the second longitudinal mating surface when the first spool piece is attached to said second spool piece;
wherein, a seal is included between the first longitudinal mating surface and the second longitudinal mating surface configured for sealing the inside of the multi-piece spool when the first spool piece is attached to said second spool piece, wherein the seal is a rubber o-ring positioned between the first longitudinal mating surface and the second longitudinal mating surface for sealing out oil from entering the multi-piece spool.

14. The axle assembly according to claim 11, wherein the first spool piece and the second spool piece including an attachment means for attaching the first spool piece and the second spool piece where the first spool piece and the second spool piece are rotationally affixed about the longitudinal axis created through the first axle and the second axle, wherein the attachment means including screws inserted through a radial protrusion created by a first radial tab of the first spool piece and a second radial tab of the second spool piece.

15. The axle assembly according to claim 11, wherein the multi-piece spool further including at least one lightening hole configured for reducing a weight of the multi-piece spool, wherein the at least one lightening hole including a plurality of lightening holes positioned around a periphery of a radial protrusion.

16. The axle assembly according to claim 11, wherein the multi-piece spool further including at least one axial hole configured for affixing the ring gear to the multi-piece spool for turning the first axle and the second axle together via the multi-piece spool, wherein the at least one axial hole including a plurality of threaded axial holes positioned around a periphery of a radial protrusion.

17. The axle assembly according to claim 11, wherein:
the first spool piece including a hollow interior configured for adding to a strength of the multi-piece spool while reducing a weight, wherein the hollow interior of the first spool piece creating a bell-shaped spool piece; and
the second spool piece including a flange configured for creating a first mating surface configured to seal to a second mating surface of the second spool piece, wherein the flange of the second spool piece creating a flange-shaped spool piece.

18. The axle assembly of claim 11 being configured for use in a rear axle of a race car.

19. A multi-piece spool comprising:
a first spool piece configured to receive a first axle, the first spool piece includes a first longitudinal mating surface; and
a second spool piece configured to receive a second axle, the second spool piece includes a second longitudinal mating surface;
said first spool piece is configured to attach to said second spool piece where the first spool piece and the second spool piece are rotationally affixed about a longitudinal axis created through the first axle and the second axle;
wherein, the multi-piece spool is configured for locking the first axle with the second axle for rotating the first axle and the second axle together when the first spool piece is attached to the second spool piece;
wherein, the first longitudinal mating surface mates to the second longitudinal mating surface when the first spool piece is attached to said second spool piece; and
wherein, the multi-piece spool further comprising a seal between the first longitudinal mating surface and the second longitudinal mating surface configured for sealing the inside of the multi-piece spool when the first spool piece is attached to said second spool piece.

20. A multi-piece spool comprising:
a first spool piece configured to receive a first axle; and
a second spool piece configured to receive a second axle;
said first spool piece is configured to attach to said second spool piece where the first spool piece and the second spool piece are rotationally affixed about a longitudinal axis created through the first axle and the second axle;

wherein, the multi-piece spool is configured for locking the first axle with the second axle for rotating the first axle and the second axle together when the first spool piece is attached to the second spool piece;

the first spool piece and the second spool piece including an attachment means for attaching the first spool piece and the second spool piece, where the first spool piece and the second spool piece are rotationally affixed about the longitudinal axis created through the first axle and the second axle;

wherein the attachment means including screws inserted through a radial protrusion created by a first radial tab of the first spool piece and a second radial tab of the second spool piece, wherein the attachment means including three flat head screws unequally spaced around a periphery of the radial protrusion, wherein the radial protrusion is outside of an o-ring between a first longitudinal mating surface of the first spool piece and a second longitudinal mating surface of the second spool piece.

21. A multi-piece spool comprising:

a first spool piece configured to receive a first axle, the first spool piece including a hollow interior configured for adding to a strength of the multi-piece spool while reducing a weight, wherein the hollow interior of the first spool piece creating a bell-shaped spool piece; and a second spool piece configured to receive a second axle, the second spool piece including a flange configured for creating a first mating surface configured to seal to a second mating surface of the second spool piece, wherein the flange of the second spool piece creating a flange-shaped spool piece;

said first spool piece is configured to attach to said second spool piece where the first spool piece and the second spool piece are rotationally affixed about a longitudinal axis created through the first axle and the second axle;

wherein, the multi-piece spool is configured for locking the first axle with the second axle for rotating the first axle and the second axle together when the first spool piece is attached to the second spool piece.

\* \* \* \* \*